G. KIRKLAND & W. WHITE.
STEERING CONNECTION FOR TRACTION ENGINES.
APPLICATION FILED JULY 6, 1908.

918,865.

Patented Apr. 20, 1909.

Witnesses:
L. L. Simpson
Harry Opsahl

Inventors:
George Kirkland
William White
By their Attorneys:
Williamson & Merchant

UNITED STATES PATENT OFFICE.

GEORGE KIRKLAND AND WILLIAM WHITE, OF WINNIPEG, MANITOBA, CANADA.

STEERING CONNECTION FOR TRACTION-ENGINES.

No. 918,865.      Specification of Letters Patent.      Patented April 20, 1909.

Application filed July 6, 1908. Serial No. 441,932.

*To all whom it may concern:*

Be it known that we, GEORGE KIRKLAND and WILLIAM WHITE, citizens of the Dominion of Canada, residing at Winnipeg in the Province of Manitoba and Dominion of Canada, have invented certain new and useful Improvements in Steering Connections for Traction-Engines; and we do hereby declare the following to be a full, clear, and exact description of the invention, such as will enable others skilled in the art to which it appertains to make and use the same.

Our invention has for its object to provide certain improvements in the steering connections for traction engines, with a view of securing increased efficiency; and to this end, our invention consists of the novel devices and combinations of devices hereinafter described and defined in the claims.

The invention is illustrated in the accompanying drawings, wherein like notations refer to like parts throughout the several views.

Figure 1:
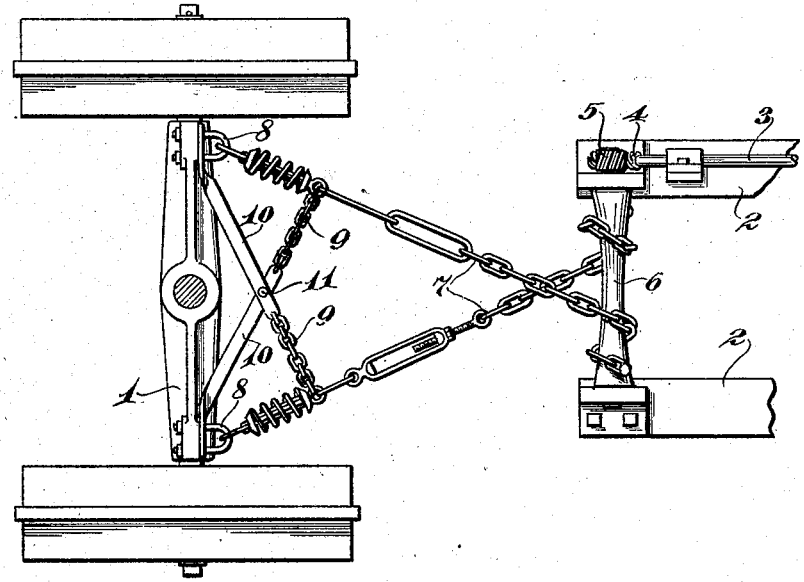
Figure 2:
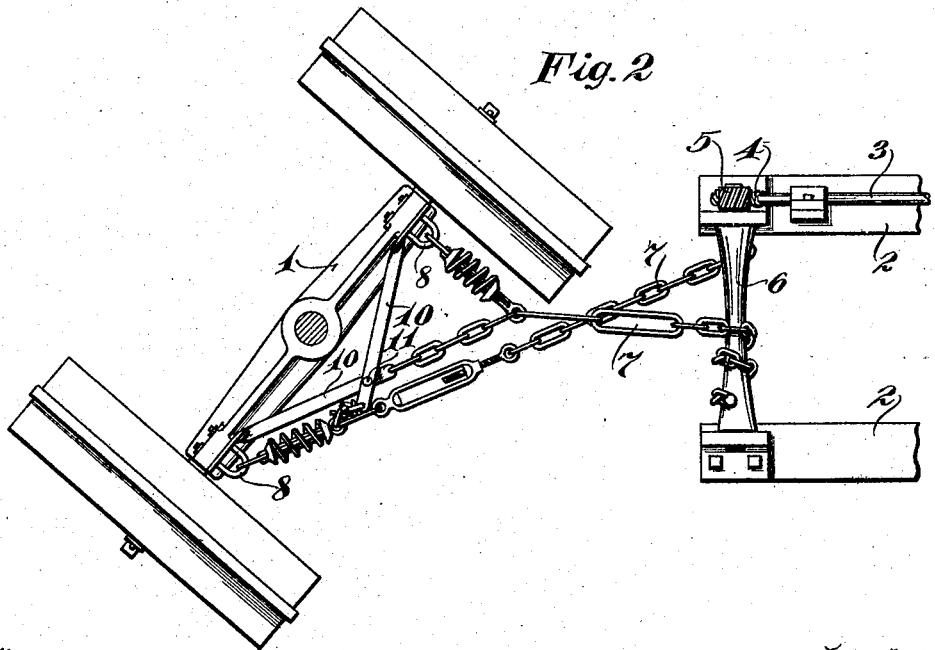

In said drawings; Figure 1 is a view chiefly in plan, but partly in horizontal section, showing the forward or pivoted truck and a portion of the main frame of a traction engine, having embodied therein our improved steering connections; and Fig. 2 is a similar view of the same parts, but with the pivoted truck in a different position.

The numeral 1 represents the forward or pivoted truck.

The numeral 2 represents the forward end portions of the engine frame.

The numeral 3 represents the steering shaft having on its forward end a worm 4 which engages with a worm gear 5 on the laterally projecting end of the windlass 6 which is suitably journaled in the engine frame 2.

The numerals 7 represent a pair of chains, the rear ends of which are made fast to the opposite ends of the windlass 6. The chains are then crossed and their forward ends made fast to the opposite end portions of the truck axle. As shown, the forward ends of the chains are secured to the truck axle by strong staples 8 bolted to the axle.

The parts so far described, to-wit, those marked with the numerals 1 to 8 inclusive, are or may be of the customary standard construction hitherto employed on traction engines. With these old or standard connections, the limit of the angular motion of the forward or pivoted truck under the control of the steering shaft 3 is determined by the contact of the inturning wheel with the shortening chain; and this will happen before the pivoted truck can swing through more than a few degrees. Otherwise stated, the available arc for pivotal motion is short. Hence, a short turn cannot be made with the engine. Moreover, the wheels and chains, by coming in contact with each other, to limit the angular throw, make a heavy wear and tear on the chains and on the wheels, with the result that the chains are speedily cut out.

Our invention has for its especial object to overcome these defects or limitations of the old or standard connections. To this end, we provide a pair of stay chains 9, and apply the same with their outer ends attached to the main chains 7 and their inner ends anchored to a rearward projection or projections 10 fixed to the truck axle. As shown, the parts 10 are in the form of wrought iron bars, the forward ends of which are rigidly secured to the end portions of the truck axle, and the opposite ends of which cross each other and are rigidly connected together by a bolt 11, or other suitable means, on the median line of the truck taken lengthwise of the engine. The chains 9 are then anchored at their inner ends to the rear ends of the bars 10, the points of anchorage thus coming near to but on opposite sides of the median line through the pivotal center of the truck. In this way, the points of anchorage for the inner ends of the stay chains 9 are brought considerably rearward of the axis of the truck axle. The points of the outer end attachment of the stay chains 9 to the main chains 7 are within the wheel base of the pivoted truck. By the addition of said stay chains 9, applied as described, it is not possible for the inturning wheel and the shortening chain to come in contact with each other, and a much larger angular throw becomes available to the pivoted truck. This can be seen by comparing the position of the parts in Figs. 1 and 2. In Fig. 1, the truck axle is parallel with the windlass 6; or otherwise stated, all the parts are in position for straight line travel of the engine. When the parts are so positioned, the stay chains 9 are both slack. Then, assume that the engine is to turn to the right. The steering shaft 3 will be turned in the proper direction to shorten or wind up the left hand chain and lengthen the right hand chain on the windlass 6. Under the winding up action of the shortening chain, the strain will take the resultant from the point of junction with the right hand stay chain 9 to the truck axle. It therefore follows that the truck can be turned until this point of junction comes substantially into a dead center or straight line extending through the pivotal center of the truck and the point at which the shortening chain is being wound onto the windlass 6; and whenever this occurs, no further angular motion can take place. The truck has been turned approximately into this position in Fig. 2 of the drawings, and from an inspection of the same, it will be seen that all parts of the shortening chain stand clear of the inturning truck wheel. If a straight edge be applied to show the line between the point of anchorage of the forward end of the tightening chain and the point at which it is winding up on the windlass 6, it will be seen that such a straight line would intersect the wheel tread at a point considerably outward of its inner edge; and from this, it can be at once seen that the increase of the angular throw rendered available by the chains 9, applied as described, is considerable. It, of course, follows that a very much shorter turn can be made with the engine as compared with an engine having the old or standard connections. The advantage in service is, of course, obvious.

It will be understood, of course, that the chains 9 and their points of attachment to the chains 7, and their points of anchorage to some rearward projection from the truck axle, must be properly located, if the maximum degree of angular throw is to be secured for the pivoted truck. The parts are properly proportioned, and the points of attachment and anchorage properly located to secure such a desired result with the steering connections illustrated in the drawings.

It must be obvious that the separate pair of bars 10 are simply a convenient means of securing a strong rearward rigid projection from the truck axle properly disposed to afford the desired anchorage for the inner ends of the chains 9, and that any other suitable means, such as a single piece bracket cast integral with the truck axle, or made in a separate piece and rigidly secured thereto, would answer the same purpose if the points of anchorage be properly located.

By actual usage we have demonstrated the practicability of the invention herein disclosed and claimed.

The flexible connections illustrated are all in the form of chains, but it will be understood, of course, that they might be made of other suitable material, as long as the same functions are present.

It will also be understood that the structure might otherwise be changed in detail without departing from the spirit of our invention.

What we claim is:—

1. In steering connections for traction engines, the combination with the pivoted truck and the windlass on the engine frame, of a pair of crossed flexible connections extending from opposite ends of the windlass to opposite end portions of the truck axle, a rearward projection on the truck axle, and a pair of flexible stays having their inner ends anchored to said projection at or near the median line of the truck and their outer ends attached to said crossed connections, substantially as and for the purposes set forth.

2. In steering connections for traction engines, the combination with the pivoted truck and the windlass on the engine frame, of a pair of crossed flexible connections extending from the opposite ends of the windlass to opposite end portions of the truck axle, a rearward projection from the truck axle, and flexible stays having their inner ends anchored to said projection at or near the median line of the truck and their outer ends attached to said crossed connections at points rearward of their anchorage to said projection but within the wheel base of the truck, substantially as and for the purposes set forth.

3. In steering connections for traction engines, the combination with the pivoted truck and the windlass on the engine frame, of the pair of crossed chains 7 extending from opposite ends of the windlass to opposite end portions of the truck axle, the pair of bars 10 rigidly secured to the truck axle at their forward ends and having the rear end portions crossed and rigidly connected together on the median line of the truck, and the stay chains 9 having their inner ends anchored to the rear ends of the bars 10 and their outer ends attached to the chains 7 within the wheel base of the truck, all for coöperation, substantially as described.

In testimony whereof we affix our signatures in presence of two witnesses.

GEORGE KIRKLAND.
WILLIAM WHITE.

Witnesses:
J. H. TURNBULL,
ALEXANDER ADAMS.